Patented Dec. 11, 1951

2,578,312

UNITED STATES PATENT OFFICE 2,578,312

ESTERIFICATION OF CERTAIN AROMATIC POLYCARBOXYLIC ACIDS

Robert J. Miller and Paul C. Condit, Berkeley, Calif., assignors to California Research Corporation, San Francisco, Calif., a corporation of Delaware No Drawing. Application January 31, 1949, Serial No. 73,862

4 Claims. (Cl. 260—475)

This invention relates to an improved process for the esterification of aromatic acids with the lower aliphatic alcohols and, particularly, to a direct esterification process as applied to solid high-melting aromatic acids.

Considerable difficulties have been experienced in the esterification of high-melting aromatic acids which are comparatively alcohol-insoluble. In the majority of instances, such acids necessitate the use of indirect esterification methods involving the preparation of intermediates and the use of expensive chemical reagents. Direct esterification of these acids with a low-boiling alcohol and an esterification catylist by refluxing requires reaction times measured in days and weeks and even then results in comparatively low conversions limited by the reaction equilibrium. For example, an attempt to prepare the dimethyl ester of terephthalic acid by conventional refluxing of a mixture of terephthalic acid, excess methanol and a sulfonic acid catylist resulted in only a 47.2% conversion to the di-ester after 120 hours of continuous operation. It is patently obvious that such esterification methods could only be applied to laboratory preparations where the economics and reaction efficiencies are of secondary consideration.

It has been discovered that this class of aromatic acids, which by virtue of their high melting points and relative alcohol-insolubility have been difficult to esterify, may now be directly reacted with an esterifying alcohol to produce substantially quantitative conversion to the ester in a short reaction time when operating in accordance with the process of the invention. Thus direct esterification of solid, alcohol-insoluble aromatic acids may be obtained by forming a slurry of the solid acid in an inert high boiling liquid and passing the esterifying alcohol through the slurry in vapor form while maintaining the temperature of reaction above the boiling point of the alcohol and substantially below the boiling point of the desired ester. The esterifying alcohol may be preheated and introduced into the reaction zone in vapor form or introduced as a liquid and vaporized within the reaction zone.

The present process is uniquely applicable to the esterification of the aromatic acids which are difficult or uneconomical to esterify by the conventional direct esterification methods. These acids are the high-melting aromatic mono- or polycarboxylic acids which generally are substantially alcohol-insoluble. By high-melting acids is meant those acids which are solid at the temperatures of reaction and possess a melting point above the esterification temperatures. As mentioned, these acids may contain one or more carboxyl groups although the process in its preferred form is particularly applied to the aromatic polycarboxylic acids. In some cases the mono-ester of a polycarboxylic acid may easily be prepared by conventional esterification methods and difficulties are only encountered in the esterification of the residual carboxyl groups. The partial or mono-esters of this type are also within the purview of the invention and, accordingly, may be further esterified by the present process.

An additional characteristic of these aromatic acids is their insolubility in the esterifying alcohol. As distinguished from the conventional esterification methods where solubility in the esterifying alcohol is one of the primary requisites, the advantages of the present process become more pronounced the greater the alcohol-insolubility of the acid. However, it has been found that this method of esterification may be applied to aromatic carboxylic acids or their anhydrides which are alcohol-soluble even to the extent of about 10% or 10 grams per 100 grams of solution at room temperature and effect a markedly improved esterification both in yield and reaction time over the conventional esterification methods.

The chemical composition of the acids appears to have little if any defining influence upon the class of aromatic acids to which the present process is directed. The aromatic acids may be mono- or polynuclear and contain substituents in addition to the carboxyl groups provided such substituents do not sterically affect the reactivity of the carboxyl groups. In spite of this apparent latitude in chemical composition, it is the physical characteristics which are substantially controlling. Thus, even in the case of isomers such as the phthalic acids, the difference in physical characteristics materially affects their ease of esterification. Whereas, ortho-phthalic acid or phthalic anhydride may be easily esterified by the conventional refluxing methods, the iso and terephthalic acids are very difficult to esterify as exemplified by the previously mentioned data. The principal differentiating characteristics of these isomers are the marked variation in alcohol-solubility and melting point. Comparison of the solubility figures in methyl alcohol expressed as grams per 100 grams of solution are as follows:

Ortho phthalic acid _____ 20.4 $^{21.4° C.}$
Phthalic anhydride _____ Easily soluble
Isophthalic acid _____ 0.85 $^{22° C.}$
Terephthalic acid _____ 0.12 $^{22° C.}$ Furthermore, the melting points of isophthalic and terephthalic acids are 349–350° C. and 435–438° C., respectively, as distinguished from the melting point of 130° C. for phthalic anhydride. In accordance with the disclosures herein, iso and terephthalic acids are used as illustrative of the general class of aromatic acids to which the invention process applies, but it is to be understood that the invention is not limited thereto.

Although the subject process may be used in conjunction with any of the conventional esterifying alcohols, it is particularly applicable to the preparation of esters from lower boiling aliphatic alcohols containing from one to four carbon atoms and preferably the $C_1$ to $C_4$ alkanols such as methanol, ethanol, propanol, isopropanol, and the butanols. The advantages of the process are especially pronounced in the preparation of the methyl esters which inherently are the most difficult of production by reason of the limitations in reaction temperatures, non-azeotropic and water-soluble characteristics of methanol and the scarcity of alternate methods of esterification. Accordingly, the detailed description of the present process will be primarily directed to the use of methanol as representative of the general class of esterifying alcohols.

In effecting the esterification of the solid, high-melting aromatic acids, the vaporized alcohol is contacted with or passed through a dispersion or slurry of the acid in an inert high-boiling liquid which may be referred to as the slurrying medium. This slurrying medium may be any one of a number of liquid compounds or mixtures of compounds, preferably polar, such as high molecular weight hydrocarbons and oxygen-containing compounds which are chemically inert to the reactants, liquid at the temperatures of reaction, and possess a boiling point or range substantially above the temperatures of reaction. The particular slurrying medium most suitable for any given esterification reaction will be dependent upon the specific reactants and the economics of the process. Although in general, any inert high-boiling liquid compound may be suitable as the slurrying medium, certain distinctions in the classes of slurrying media have been noted. Thus, it has been found that esters and particularly the crude esterification products, when used as the slurrying medium, are of advantage, not only in minimizing the number of product components, but also in materially increasing the esterification reaction rate. For example, when using a dimethyl phthalate as the slurrying medium in the methylation of either iso or terephthalic acid, the reaction rate was five times greater than was obtained by the use of a white oil as the slurrying medium. The acid slurry should be sufficiently dilute to enable efficient reaction contact with the alcohol vapors. Proportions of slurrying medium to acid of at least 2.5:1, and preferably at least 4:1, have been found satisfactory.

The operating conditions of the process will necessarily vary and are dependent upon the particular acid and esterifying alcohol employed. The temperature of reaction is maintained above the boiling point of the esterifying alcohol and substantially below the boiling or decomposition point of the ester product. As a general proposition, temperatures in the range of from 80° C. to about 200° C. may be used with preference given to the higher temperatures in that range such as 120–200° C.

The esterification may be carried out either in the presence or absence of a conventional esterification catalyst. However, in preferred operations a catalyst is utilized. These catalysts may be any of the accepted proton donors or electron acceptors which have previously been proposed or used in the esterification art. Examples of the esterification catalysts include sulfuric acid, sulfonic acids, sulfonates and sulfates, hydrogen chloride, phosphoric acid, etc. The amount of catalyst used is not critical to the process and, generally, amounts in the range of 2–5% by weight, based on the reaction mixture, will be satisfactory.

The process itself may be conducted either batch-wise or continuously with inclusion of such procedural details and modifications as may be deemed expedient within the knowledge and skill of the art. In the preferred embodiment the powdered iso or terephthalic acids, or mixtures thereof, are dispersed in a slurry medium, such as a dimethyl phthalate, in a proportionate ratio of at least four parts of slurry medium to one part of acid and the acid slurry introduced into a heated reaction vessel. The temperature of the reactor is maintained at between 120 to 200° C. and preferably around 150° C. A suitable esterification catalyst such as concentrated sulfuric acid or an aromatic sulfonic acid is incorporated into the slurry and vaporized methanol is brought into contact with the acid slurry. The rate of methanol flow is not critical, but a certain amount of excess methanol vapor is desirable to entrain and remove overhead the water of esterification. The overhead effluent may be condensed and methanol recovered for recycle to the system. When operating continuously, the liquid dimethyl ester may be continuously or intermittently withdrawn and the acids continuously charged to the reactor to maintain a uniform concentration of acid in the esterification product.

The following examples are presented as representative of the preferred embodiment of the invention and are not to be construed as a limitation thereof.

*Example 1*

166.6 grams of terephthalic acid was slurried in 666.6 grams of dimethyl orthophthalate. The slurry was introduced into a cylindrical reactor provided with a tube extending to the bottom of the vessel for the introduction of methanol vapor. The reactor also possessed an outlet at the top of the vessel which was connected to a water condenser for drawing off and condensing the overhead stream. The reactor and contents were immersed in an oil bath maintained at 149° C. When the slurry arrived at the bath temperature, 26 grams, or 3% by weight, of 96% sulfuric acid was added and methanol vapor introduced into the reactor at a rate of 5 ml. (liquid) per minute. The progress of the esterification was checked from time to time by determining the neutralization number of the reaction mixture. Completion of the reaction was indicated in a little over six hours of operation.

Isophthalic acid was esterified in the same manner as above and complete esterification was obtained in less than two hours.

*Example 2*

44.5 grams of a synthetic mixture of iso and terephthalic acid (2.6 parts iso to 1 part tere) was slurried in 178 grams of mixed dimethyl esters of iso and terephthalic acid (2.6 parts iso to 1 part tere). These proportions of iso and terephthalic acids used in the mixture are of the same order of magnitude as that normally obtained by the oxidation of an equilibrium mixture of xylene isomers or toluic acids produced therefrom. The acid slurry was then heated to 149° C. and 7 grams, or 3% by weight, of concentrated sulfuric acid was added. Methanol vapor was then bubbled through the mixture at a rate of 5 ml. (liquid) per minute. The esterification reaction was complete in less than 2 hours.

*Example 3*

166.1 grams of terephthalic acid was slurried in 666.6 grams of White Oil Heavy and the slurry introduced into the previously described reactor which was heated to 149° C. 26 grams of 96% sulfuric acid was then added and methanol vapor passed through the reaction mixture at a rate of 5 ml. (liquid) per minute. As in the previous examples progress of the reaction was checked periodically by neutralization number determinations. In this run the reaction was halted at the end of six hours at which time the reaction mixture possessed a neutralization number of 102. Extrapolation of the reaction rates with those obtained in Example 1 showed that the present reaction would require approximately five times the reaction time obtained in Example 1.

Obviously, many modifications and variations of the invention as hereinbefore set forth may be made without departing from the spirit and scope thereof, and only such limitations should be imposed as are indicated in the appended claims.

We claim:

1. A process for the production of esters of high-melting alcohol-insoluble aromatic polycarboxylic acids which comprises slurrying the acid in an inert high-boiling slurry medium consisting essentially of a neutral liquid ester of the aromatic polycarboxylic acid and contacting said acid slurry with a vaporized alcohol containing 1 to 4 carbon atoms per molecule while maintaining the temperature of reaction in the range 120 to 200° C.

2. A process for the production of esters of isophthalic and terephthalic acids which comprises introducing a vaporized aliphatic alcohol containing 1 to 4 carbon atoms into a slurry of the acid in an inert high-boiling slurry medium consisting predominantly of a phthalic acid ester and in the presence of an esterification catalyst while maintaining the temperatures of reaction substantially above the boiling point of the esterifying alcohol and substantially below the boiling point of the desired ester.

3. A process for the production of esters of high-melting alcohol-insoluble aromatic polycarboxylic acids which comprises slurrying the acid in a neutral liquid ester of said aromatic carboxylic acid, contacting said acid slurry with a vaporized aliphatic alcohol containing 1 to 4 carbon atoms per molecule in the presence of an esterification catalyst while maintaining a temperature of reaction in the range 120 to 200° C.

4. A process for esterifying isophthalic and terephthalic acids with alcohols containing 1 to 4 carbon atoms per molecule which comprises forming a slurry of the acid in a phthalic acid diester, heating the slurry to an elevated temperature at least 120° C. but below the boiling point of said diester, and passing the alcohol in vapor phase through the slurry.

ROBERT J. MILLER.
PAUL C. CONDIT.

REFERENCES CITED

The following references are of record in the file of this patent:

UNITED STATES PATENTS

| Number | Name | Date |
|---|---|---|
| 1,883,182 | Webel | Oct. 18, 1932 |
| 2,020,356 | Hawley et al. | Nov. 12, 1935 |
| 2,091,241 | Kvalnes | Aug. 24, 1937 |
| 2,459,014 | Cavanaugh et al. | Jan. 11, 1949 |